(No Model.)
J. J. DEAL.
Corn Cultivator.
No. 242,279.  Patented May 31, 1881.
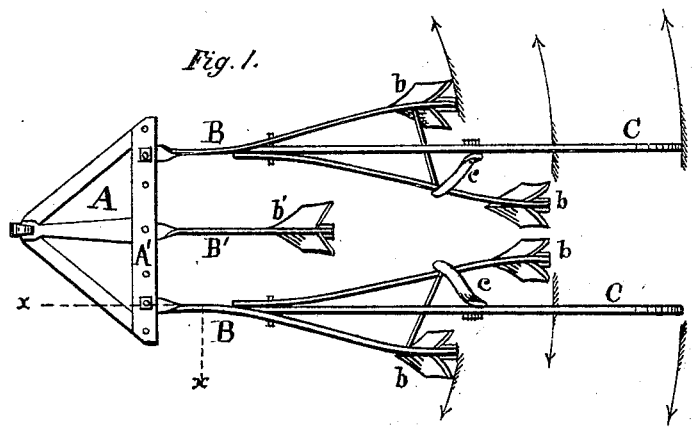
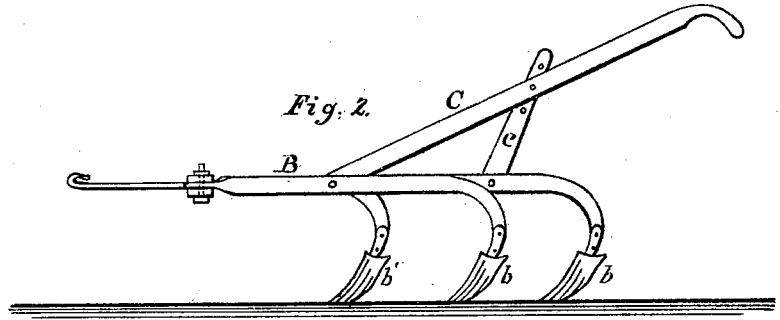
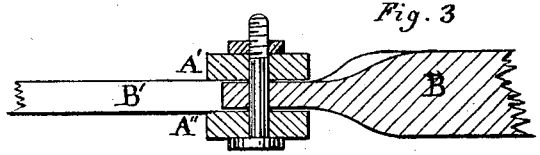
Witnesses:
Thos. Houghton
E. M. Edwards
Inventor:
Josiah J. Deal
for Wm. R. Singleton
Atty

UNITED STATES PATENT OFFICE.

JOSIAH J. DEAL, OF WILMOT, OHIO, ASSIGNOR OF ONE-FOURTH TO WM. M. JOHNSTON, OF SAME PLACE.

CORN-CULTIVATOR.

SPECIFICATION forming part of Letters Patent No. 242,279, dated May 31, 1881.

Application filed April 6, 1881. (No model.)

*To all whom it may concern:*

Be it known that I, JOSIAH J. DEAL, of Wilmot, in the county of Stark and State of Ohio, have invented certain Improvements in Corn-Cultivators, of which the following is a specification.

This invention relates to improvements in corn-cultivators; and it consists in the use of a double back bar in which the front ends of the plow-beams are properly sustained, all of which will be hereinafter more fully explained, and set forth in the claim.

Figure 1 is a top view of the cultivator. Fig. 2 is a side elevation of the same. Fig. 3 is an enlarged vertical section on $x$ $x$ of Fig. 1.

A represents a metal frame, in which the plow-beams B B are pivoted by means of screw or other bolts or removable rivets. These plow-beams B B have attached to them in any suitable manner the plow-points $b$ $b$, arranged on each side of the beams.

B′ is a beam in the middle, secured to the front end of the braces and between the two back bars, A′ A″, and to its rear end is a plow-point, $b'$.

The frame A has in front two converging arms or braces, meeting and forming the hook for fastening the horse or team for drawing the cultivator. A semicircular brace may be used in place of the triangular one, the back bars forming the diameter or chord of the segment.

The handles C C are attached to the side beams, B B, and are adjustably supported on uprights $c$ $c$, having a series of holes in their upper ends, and pins whereby the handles may be fastened at different angles.

The back bars, A′ A″, have in them series of holes, $a$ $a$, so that the front ends of the side beams, B B, may be pivoted near to or farther from the middle beam, B′, thus arranging the cultivator for different widths of rows.

The side beams, B B, being pivoted at the front end between two back bars, instead of the usual single bar, gives a firm strain upon the bolts instead of the strain being constantly upon the one bearing in the single bar. Lighter bolts can be used. They will not wear out so soon, and the whole arrangement makes a lighter and yet stronger frame.

The handles being adjustable vertically, and the beams pivoted in front, permits the person guiding the cultivator to adapt it to any width of row, and sets the plows to the rake required by elevating or lowering the handles.

I claim—

In a cultivator without wheels, the frame A, having the double back bar, A′, in combination with the independent beams B B′ and the adjustable handles C, whereby each plow-beam can be swung separately while in action, substantially as and for the purpose described.

JOSIAH J. DEAL.

Witnesses:
WM. M. JOHNSTON,
JOHN MEESE.